June 28, 1966 N. H. SHEPHERD 3,258,694

S.S.B. MULTI-CHANNEL F.M. TRANSMITTER WITH AUTOMATIC MODULATION INDEX CONTROL

Filed Jan. 4, 1963 4 Sheets-Sheet 1

INVENTOR.
NEAL H. SHEPHERD

BY Frank L. Neuhauser

ATTORNEY

June 28, 1966 N. H. SHEPHERD 3,258,694

S.S.B. MULTI-CHANNEL F.M. TRANSMITTER WITH AUTOMATIC MODULATION INDEX CONTROL

Filed Jan. 4, 1963 4 Sheets-Sheet 2

INVENTOR.
NEAL H. SHEPHERD

BY

Frank L. Neuhauser

ATTORNEY

S.S.B. MULTI-CHANNEL F.M. TRANSMITTER WITH AUTOMATIC MODULATION INDEX CONTROL

Filed Jan. 4, 1963 4 Sheets-Sheet 3

INVENTOR.
NEAL H. SHEPHERD

BY

ATTORNEY

June 28, 1966 N. H. SHEPHERD 3,258,694

S.S.B. MULTI-CHANNEL F.M. TRANSMITTER WITH AUTOMATIC MODULATION INDEX CONTROL

Filed Jan. 4, 1963 4 Sheets-Sheet 4

INVENTOR.
NEAL H. SHEPHERD

BY

Frank L. Neuhauser

ATTORNEY

United States Patent Office 3,258,694

Patented June 28, 1966

3,258,694
S.S.B. MULTI-CHANNEL F.M. TRANSMITTER WITH AUTOMATIC MODULATION INDEX CONTROL

Neal H. Shepherd, Lynchburg, Va., assignor to General Electric Company, a corporation of New York Filed Jan. 4, 1963, Ser. No. 249,507
15 Claims. (Cl. 325—145)

This invention relates to communication systems for transmitting a plurality of subcarrier information signals from a single radiating means and for optimizing the transmitted signal level.

A fundamental characteristic of a frequency modulated (F.-M.) signal is that frequency deviation ($f_d$) is proportional to the peak amplitude of the modulating signal and is independent of the modulating frequency: $f_d$ is defined by the expression $$f_d = K_f \frac{E_m}{2\pi}$$

where $K_f$=is a proportionality factor which determines the maximum frequency variation for a given modulating signal strength $E_m$=peak amplitude (i.e., strength) of the modulating signal.

By varying the amplitude of the modulating signal, it is possible to vary the frequency deviation. Furthermore, the index of modulation ($\delta$) of the frequency modulated signal is directly proportional to frequency deviation;

$$\delta = \frac{W_d}{\omega_m} = \frac{2\pi f_d}{\omega_m} = \frac{2\pi\left(K_f \frac{E_m}{2\pi}\right)}{\omega_m} = \frac{K_f E_m}{\omega_m}$$

where $\omega_m$=is the angular frequency of the modulating signal in radians. Accordingly, by varying the amplitude $E_m$ of the modulating signal, the index of modulation $\delta$ is also varied.

A further characteristic of a frequency modulated signal is that its frequency spectrum consists of a carrier and an infinite number of sidebands all of whose amplitudes are various orders of Bessel functions, with the index of modulation $\delta$ being the argument of a Bessel function of the first kind and $n$th order. Thus the amplitude of the sidebands of the modulated signal in turn depends upon the value of the index of modulation ($\delta$). In a system for transmitting a frequency modulated signal, it thus becomes possible to maintain the transmitted output signals at an optimum level by controlling the index of modulation.

Accordingly, a principal object of this invention is the provision of an improved frequency modulation transmitter for transmitting information at a selected sideband frequency and maintaining the signal level of the transmitted sideband at an optimum value.

A further object of the invention is to provide an improved frequency modulation multi-channel communication system wherein the index of modulation of the frequency modulated signals is controlled to optimize the output signal level.

A further object is the provision of an improved multi-channel frequency modulation transmission system for transmitting a plurality of signals at a selected portion of the frequency spectrum and maintaining the amplitude of the transmitted signal at an optimum in response to the relative level of the signal in a different portion of the frequency spectrum.

A still further object of the invention is the provision of a multi-channel frequency modulation transmission system for transmitting a plurality of information signals at a selected sideband frequency with a control means to maintain the amplitude of the transmitted signal at a maximum.

Other objects and advantages of the invention will become apparent as the description thereof proceeds.

A feature of this invention is the provision of a multi-channel frequency modulation transmission system for transmitting a plurality of subcarrier information signals from a single radiating means. In one embodiment of the invention, a plurality of individually amplified subcarrier signals are combined in a signal combining means and utilized to frequency modulate a carrier. One of the first sidebands of the F.-M signal, either the lower or upper, which sideband includes the various subcarriers, is coupled to the antenna and transmitted. The second sideband ($f_c \pm 2f_m$) and the unmodulated carrier frequency $f_c$ are compared in a control means, and used to regulate the amplitude level of the individual subcarrier signals to maintain the index of modulation at a predetermined level to optimize the amplitude of the transmitted first sideband. In the preferred embodiment, the index of modulation is maintained at approximately a value of 1.84, at which point the unmodulated carrier frequency signals, and the second lower sideband signals, are equal in amplitude. Under these conditions, the first sideband signal is transmitted from the radiating means at a maximum level, one which is less than 5 decibels below the peak amplitude of the unmodulated carrier frequency signal.

Other objects, features and advantages of the invention will become apparent from the following detailed description which is accompanied by drawings in which.

Figure 1:
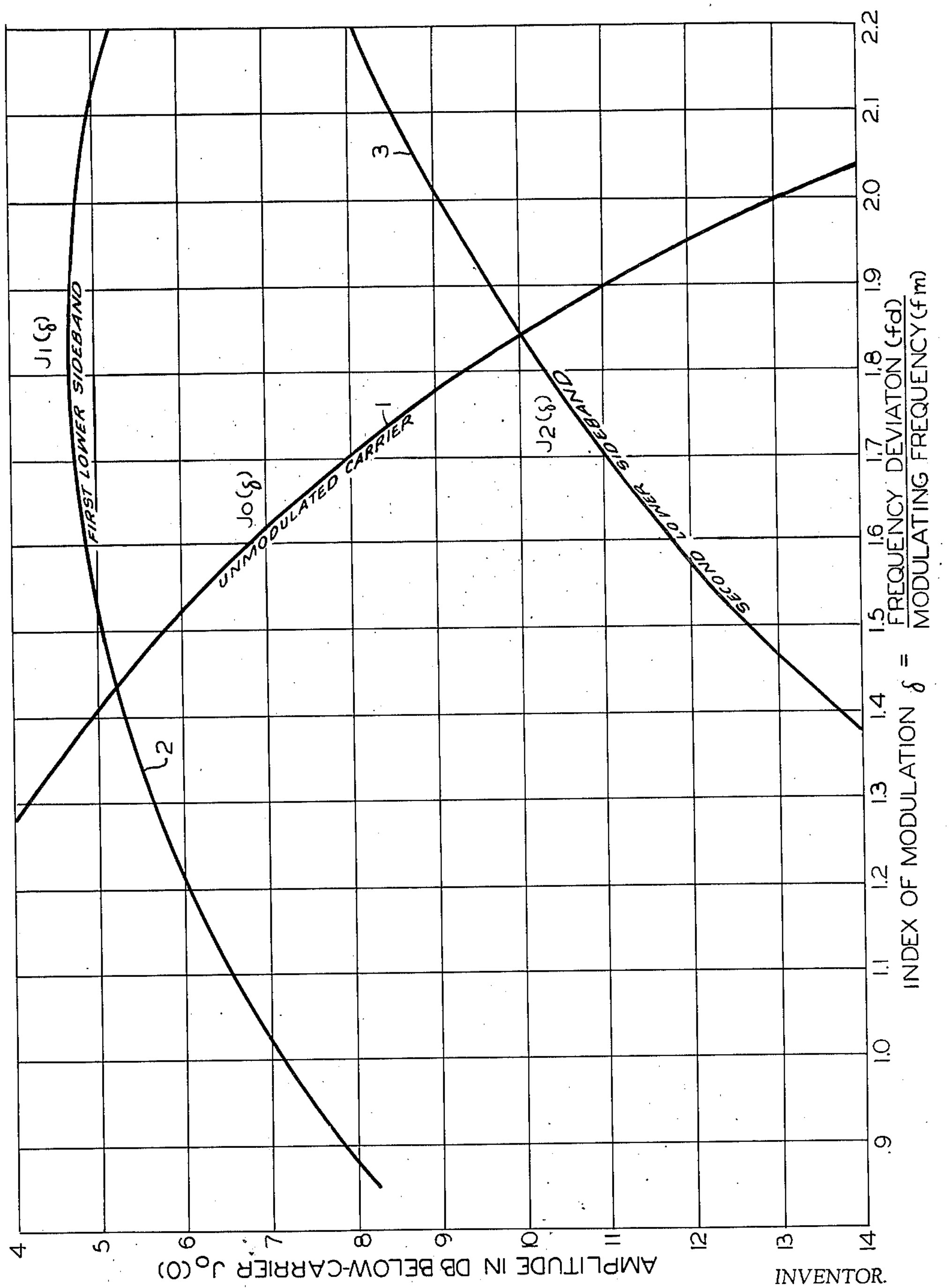
FIG. 1 is a graph derived from the Bessel functions of the unmodulated carrier frequency signal, the first lower sideband signal and the second lower sideband signal of a frequency modulated signal with the index of modulation as the abscissa and amplitude response as the ordinate.

Before describing a multi-channel frequency modulation communication system embodying the instant invention wherein the intermodulation between the carriers is minimized and the amplitude level of the transmitted signal is maximized, it will be useful, for a full understanding of the invention, to consider first the nature and characteristics of a frequency-modulated (F.-M.) wave. It can be shown that a frequency modulated wave can be defined by the expression $$e(t) = E_c \sin(w_c t + \delta \sin w_m t) \quad (1)$$

where $E_c$=amplitude of the carrier wave $\omega_c$=the angular frequency of the carrier wave in radians $\omega_m$=the angular frequency of the modulating wave in radians $\delta$=the index of modulation, defined previously, which is dimensionless $t$=time in seconds.

The spectrum of the F.-M. wave may be determined by expanding the expression for the F.-M. wave, thus $$e(t)=E_c[\sin \omega_c t \cos (\delta \sin \omega_m t)+\cos \omega_c t \sin (\delta \sin \omega_m t)] \quad (2)$$

It can be shown, however, that $$\cos (\delta \sin \omega_m t)=J_o(\delta)+2\sum_{n=1}^{\infty} J_{2n}(\delta) \cos 2n\omega_m t \quad (3)$$

and $$\sin (\delta \sin \omega_m t)=2\sum_{n=0}^{\infty} J_{2n+1}(\delta) \sin (2n+1)\omega_m t \quad (4)$$

where the function $J_n(\delta)$ is a Bessel function of the first kind and of the order $n$. The F.-M. waveform of Equation 2 then becomes:

$$e(t)=E_c \sin \omega_c t[J_0(\delta)+2J_2(\delta) \cos 2\omega_m t+2J_4(\delta) \cos 4\omega_{2m} t+ \ldots)+E_c \cos \omega_c t[2J_1(\delta) \sin \omega_m t+2J_3(\delta) \sin 3\omega_m t+ \ldots) \quad (5)$$

which may, by use of suitable trigonometric identities $$\text{Sin } A \cos B=\tfrac{1}{2}[\sin (A+B)+\sin (A-)]$$

in turn may be rewritten as, $$\begin{aligned} e(t)=&J_0(\delta)E_c \sin \omega_c t \quad (6)\\ &+J_1(\delta)E_c [\sin (\omega_c+\omega_m)t-\sin (\omega_c-\omega_m)t]\\ &J_2(\delta)E_c [\sin (\omega_c+2\omega_m)t+\sin (\omega_c-2\omega_m)t]\\ &+J_3(\delta)E_c [\sin (\omega_c+3\omega_m)t-\sin (\omega_c-3\omega_m)t]\\ &\quad\vdots\\ &+J_n(\delta)E_c [\sin (\omega_c+n\omega_m)t\pm\sin (\omega_c-n\omega_m)t]\end{aligned}$$

It is apparent from Equation 6 that the spectrum of an F.-M. wave consists of a carrier $\omega_c$ and an infinite number of sidebands $(\omega_c\pm n\omega_m)$ spaced by the modulating frequency, $\omega_m$. The amplitudes of the sidebands are various order Bessel functions. If the value of the Bessel function $J_n(\delta)$ for various orders $n=0, 1, 2, 3, \ldots$, and the argument of the function, in this case the modulation index $\delta$, is plotted it will be found that the first order function $J_1(\delta)$ is at a maximum for $\delta=1.84$, i.e., the amplitude of the information bearing first sideband $E_c \sin (\omega_c\pm\omega_m)t$ is at a maximum for the given input carrier level $E_c$. It will also be noted that at $\delta=1.84$, the zero and second order functions $J_0(\delta)$ and $J_2(\delta)$ are equal, i.e., the amplitudes of the unmodulated carrier component $\omega_c$ and the second sideband $E_c \sin (\omega_c\pm 2\omega_m)t$ are equal.

FIG. 1 illustrates the variations of the functions with changes in $\delta$. Amplitude of the components is plotted along the ordinate (as loss in decibels (db) from the value of the first order function $J_0$ at $\delta=0$; i.e., $J_0(0)$), and the values of $\delta$, in the range of $.9<\delta<2.2$, along the abscissa. Curve 1 represents the zero order function $J_0(\delta)$ and hence, the unmodulated carrier component of the F.-M. wave, curve 2 the first order function $J_1(\delta)$ and the first lower sideband, for example, and curve 3 the second order function $J_2(\delta)$ and the second lower sideband, for example. The intersection 4 of curves 1 and 3 represents equal signal amplitudes for the unmodulated carrier component and the second sideband and occurs at a value of $\delta=1.84$. At this index of modulation value the amplitude of the first sideband is at a maximum and is less than 5 db down from the original undeviated carrier level, i.e., $\delta=0$.

It will now be appreciated that (1) The information bearing portion of the frequency spectrum [i.e., the first sideband $\sin (\omega_c\pm\omega_m)t$] of an F.-M. wave is at an optimum level when the index of modulation is at a predetermined, known, value or values (i.e., $\delta=1.84$, etc.).

(2) That the relative amplitudes of other portions of the frequency spectrum of the F.-M. wave bear known relationships to themselves or each other at the predetermined value or values of the index $\delta$.

(3) The index of modulation $\delta$ is a function of the amplitude $E_m$ of the modulating signal.

Therefore, in carrying out the principles of this invention, the power level of the information bearing transmitted signal is maintained at an optimum level by sensing the relative level of another portion of the frequency spectrum producing a control signal in response thereto which is a measure of the deviation from the desired optimizing value or values of the index $\delta$, and controlling the amplitude of the modulation signal to maintain $\delta$ at the desired value, or values, for optimum power output of the transmitted signal. The manner is which the relative level of another portion of the F.-M. spectrum is utilized to control $\delta$ may vary substantially. For example, as in the preferred embodiment, the unmodulated carrier component and the second sideband may be compared to determine if they are equal in which event $\delta=1.84$, and the output level is at a maximum. Alternatively, other sidebands may be compared with the unmodulated carrier or each other. For example, tabulated below are selected values of $\delta$, the amplitudes of various sidebands and of the carrier component, the amount of loss in the first sideband (in absolute terms) relative to the unmodulated carrier $f_c$ for $\delta=0$, i.e., $J_o(0)$.

| $\delta$ | $J_0(\delta)$ | $J_2(\delta)$ | $J_3(\delta)$ | $J_4(\delta)$ | $J_1(\delta)$ | Loss percent |
|---|---|---|---|---|---|---|
| 2.2 | $.16J_o(0)$ | $.37J_o(0)$ | $.16J_o(0)$ | $.05J_o(0)$ | $.56J_o(0)$ | 3.4 |
| 6.6 | $.27J_o(0)$ | $-.31J_o(0)$ | $-.10J_o(0)$ | $.27J_o(0)$ | $-.18J_o(0)$ | 68.0 |
| 5.3 | $-.07J_o(0)$ | $-.08J_o(0)$ | $.3J_o(0)$ | $.3J_o(0)$ | $.34J_o(0)$ | 41.5 |
| 1.0 | $.78J_o(0)$ | $.11J_o(0)$ | $.01J_o(0)$ | ---------- | $.44J_o(0)$ | 24.2 |

Thus, at $\delta=2.2$, the carrier component and third sideband are equal and may be used to control $\delta$ to maintain it at this deviation ratio with a loss of only 3.4% from the maximum value of the first sideband. At $\delta=6.6$, the carrier and the fourth sideband may be compared. However, here the loss in the first sideband is 68% from the maximum value possible and may not be desirable to use this point of comparison because of the losses involved. It is also clear that different sidebands may be compared to each other, as for example, at $\delta=5.3$, the third and fourth sidebands $J_3(\delta)$ and $J_4(\delta)$ are equal and may easily be compared. However, the loss in the first sideband is approximately 41% from the value at $\delta=1.84$.

Furthermore, the sidebands and the unmodulated carrier component may be compared with themselves, etc. The point being, that although maintaining the value of $\delta$ at 1.84 by comparing the unmodulated carrier component with the second sideband is the preferred approach, the invention is not limited thereto, other values of $\delta$ and other schemes for comparing the relative amplitudes of other portions of the F.-M. wave frequency spectrum may be utilized to control the modulating signal and thereby optimize the output level of the information bearing first sideband.

Figure 2:
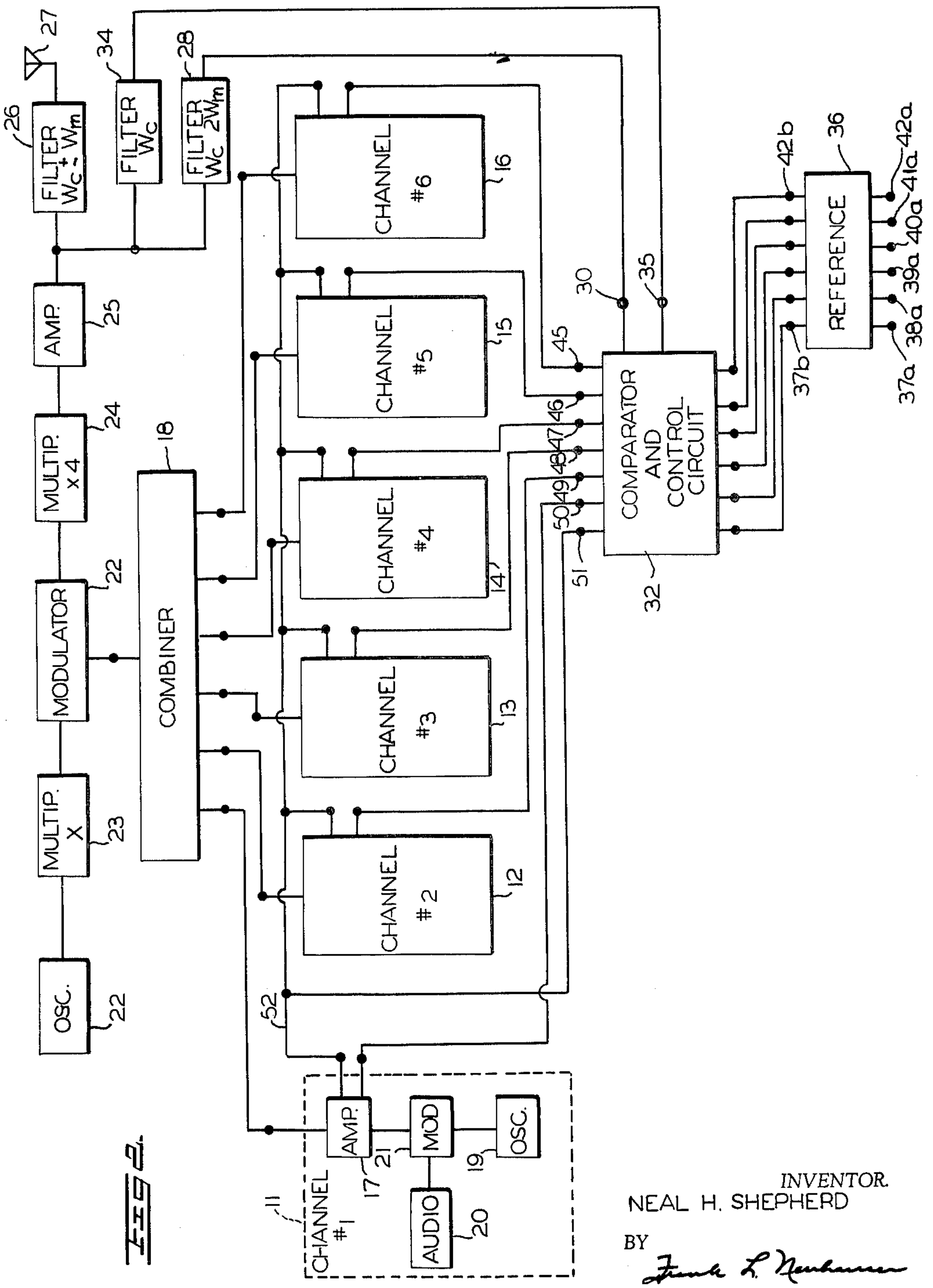
FIG. 2 is a block diagram of a preferred embodiment of the multi-channel transmission system of the invention utilizing individually amplified subcarrier frequency signals.

FIG. 2 shows a preferred embodiment of a multi-channel communication system constructed in accordance with the invention. Six voice modulated subcarrier information signals, which for the purposes of this description may range from 5.00 to 5.05 megacycles with a spacing of ten kilocycles between the subcarriers, are fed from individual subcarrier signal channels 11–16 to a signal combiner 18. One channel of combiner 18 is shown in detail in FIG. 2 and will be discussed in detail later. Each of the signal channels, only one of which is shown in detail, includes a carrier source such as 19, which may be any known signal generating means, such as a crystal-oscillator-multiplier combination or the like, the output of which is coupled, along with audio signals from audio source 20, to a modulator 21. The modulated signal is amplified in amplifier 17, which is any known conventional, controllable variable gain amplifier stage. Amplifier 17 may, for example, be of the pentode type and includes a screen grid electrode and plate electrode. The bias of either or both of these electrodes may be varied to vary the gain of the amplifier.

The channel combiner 18 combines the six subcarrier frequency signals into a single signal which is applied as a modulating signal to modulator 22, which may be of the frequency or phase modulating type. This signal modulates a carrier frequency signal from the oscillator-frequency-multiplier combination 22–23. In one embodiment of the invention, a carrier frequency signal of 40 megacycles was modulated with six combined subcarrier signals ranging from 5.00 to 5.05 megacycles to produce a frequency modulated signal with an index of modulation of .46. The frequency deviation produced by this modulation is approximately ±2.3 megacycles.

The signal from the modulator 22 is fed to a frequency multiplier 24 and the output signal from the modulator is raised to a frequency suitable for transmission and having the desired index of modulation $\delta$. In the exemplary case the multiplication factor is four. The unmodulated carrier frequency signal ($f_c$) is, therefore, 160 magecycles, the second upper sideband of 170–170.10 megacycles, the first upper sideband 165–165.05 megacycles, the first lower sideband of 155–154.95 megacycles, and the second lower sideband of 150–149.90 megacycles. Furthermore, the index of modulation $\delta$ is also increased by a factor of four to a value of 1.84 thus optimizing the level of the information bearing first sideband.

The output of the multiplier 24 is connected to an amplifier 25 for raising the signal output to a level suitable for transmission. For the most efficient operation, the amplifier should be of the Class C type but both Class A and Class B will operate successfully. Amplifier 25 is connected to a filter 26 which is designed to pass only the first sideband, and preferably the lower sideband, to antenna 27.

The second sideband signal, and preferably the lower sideband, is passed through filter 28 to input terminal 30 of comparator and control means 32. The unmodulated carrier frequency signal component at the output of amplifier 25 is passed through carrier filter 34 to input terminal 35 of the control means.

Control means 32 is responsive to the relative signal level of another portion of the F.-M. frequency spectrum, and in this instance to the relative levels of the unmodulated carrier frequency component and the second lower sideband signal to produce a control signal for controlling the individual amplifiers of the subcarrier signal channels. These control signals, which vary in amplitude with the relative amplitudes of the carrier and second sideband, and in sign with direction, are applied to the amplifiers, thereby varying the amplitude $E_m$ of the modulating signal, i.e., the 5.00 to 5.05 megacycle voice modulated subcarrier frequency information signal. In this manner, the frequency deviation of the frequency modulated 40 megacycle carrier frequency signal at the output of modulator 22 is varied thereby controlling the index of modulation $\delta$.

Accordingly, control means 32 maintains control over the index of modulation of the modulated signal and thereby maintains the amplitude of the transmitter first lower sideband at the desired value. If the unmodulated carrier frequency signal amplitude level is equal to that of the second lower sideband signal level, the control signals from control means 32 maintains the amplitude of the modulating signals at a value such that the index of modulation will remain at approximately 1.84 producing an optimum signal level for the transmitted signals at the first lower sideband frequency.

Control means 32, which will be described in greater detail with reference to FIG. 3, controls the supply voltage levels and hence the gain of all of the individual channel amplifiers in response to the relative amplitudes of the unmodulated carrier component and the second sideband in order to control the amplitudes ($E_m$) of the modulating signals. In addition to this overall control, the gain of the individual channels may be controlled separately in response to control signals applied to the control circuit from the reference means which controls the amplitudes of the individual channel signals in response to preset reference control signals. These reference control signals may, for example, be generated in response to the output of the receiver associated with the corresponding channel of the transmitter illustrated in FIG. 1. For example, channel 1 may be transmitting to a location which is fairly remotely located while channel 2 may be transmitting to a much closer location. It is clear, therefore, that the power level of the transmitted signal on channel 2 in order to establish good communication may be less than that necessary to establish adequate communication to the location serviced by channel 1. Hence, it is desirable under certain circumstances to control the individual channels. The reference circuit 36 provides these additional control signals either on a pre-programmed basis or in response to the signal strength of the signal received by the receiver associated with the individual channels. Reference circuit 36 includes six input terminals **37*a*–42*a* which may be connected to the individual receivers and have the received signals impressed thereon. These received signals may be rectified and stored in individual capacitors to provide varying unidirectional reference control signals proportional to the received signal strength. The reference control signals are coupled by means of output terminals 37*b*–42*b* to comparator and control circuit 32. In the event that the reference control signals are pre-programmed, i.e., relative magnitudes of the reference control signals are fixed for the various channels, input terminals 37*a*–42*a*** may obviously be dispensed with.

The channel amplifier control signals from control circuit 32 are applied from output terminals 45–50 to the individual control elements of the individual amplifiers of channels 1–6. The control signals at terminals 45–50 are proportional both to the ratio of the unmodulated carrier component and the second sideband, and to the reference control signal from reference circuit 36. These compound signals may, as will be pointed out later in connection with FIG. 3, be applied to the screen electrode of a tetrode or pentode forming the channel amplifiers or to any other control element of the channel amplifying device. Control circuit 32 also includes an output terminal 51 which is coupled to each of the channel amplifiers by a common bus 52. The control signal at terminal 51 is proportional to the ratio of the unmodulated carrier component and the second sideband and may be used to control the gain of all the channels simultaneously and to the same degree. Thus a common gain control of the subcarrier channels is provided as well as independent gain control of the individual channels.

Figure 3:
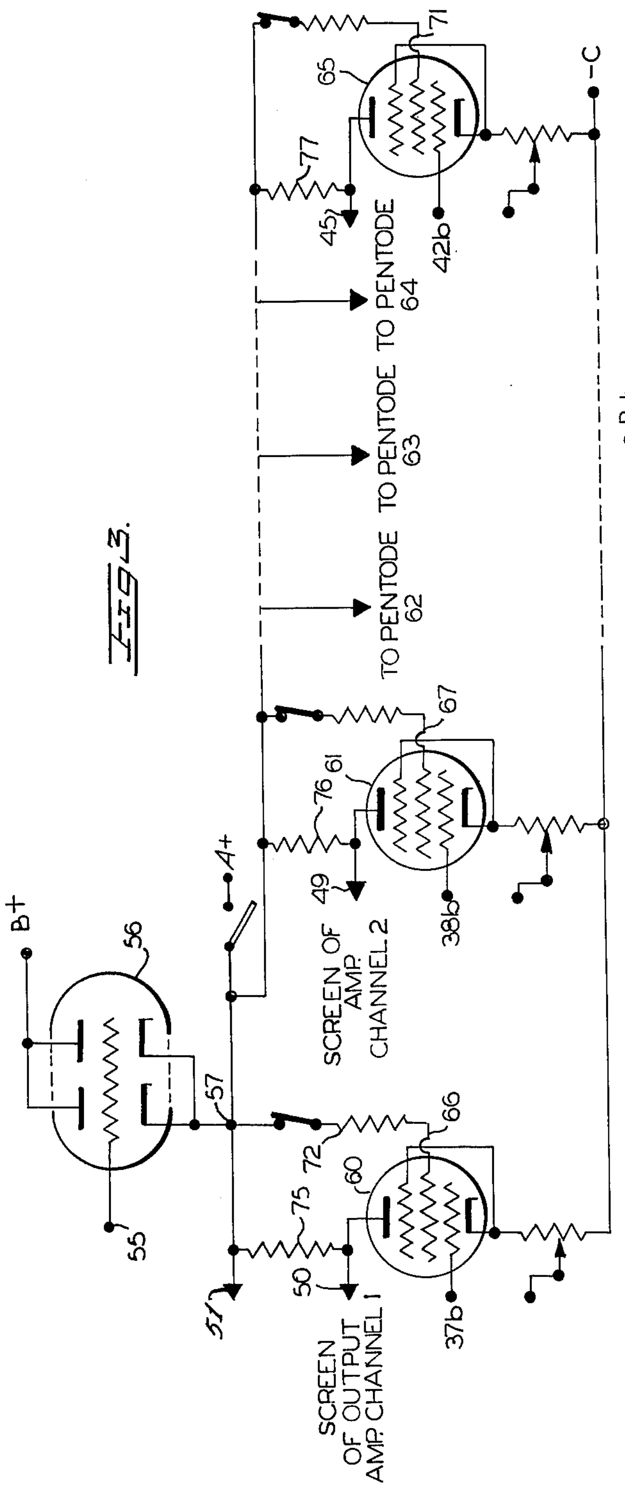
FIG. 3 is a circuit diagram of the power control circuit in the preferred embodiment of the subject invention.

FIG. 3 shows the details of control circuit 32 of FIG. 2. The control signal proportional to the ratio of carrier to second sideband is applied to terminal 55 and thence to the control grids of dual triodes 56 mounted in a common envelope. The cathodes of the triodes are tied together and connected to a junction point 57 located between a source of positive potential A+ and output terminal 51. Similarly, both anodes are directly connected to a more positive terminal B+ of the energizing source. The conductivity of triodes 56 varies in response to the control voltage, as does its plate resistance $r_p$. The triodes, therefore, act as a variable resistance element and the potential at point 57 (and hence the potential at output terminal 51) varies in response to the control signal. The potential at terminal 51 varies correspondingly and since it supplies the plate potential for all the channel amplifiers, a certain degree of gain control. The degree of gain control varies with the type of amplifier utilized. With multi-element tubes such as tetrodes and pentodes, the degree of gain control is relatively small since the plate voltage exercises a relatively small effect on the gain as compared to triodes. However, a certain degree of gain control is achieved in this manner.

The potential variations at point 57 are also utilized to control the gain of a plurality of control pentodes 60–65, only three of which are shown. These pentodes are utilized to control the gain of the individual channel amplifiers by varying the screen grid voltage of the tetrodes and pentodes utilized in those amplifiers in response to both the reference control signal from reference circuit 52 and the control signal proportional to the ratio of carrier signal to second sideband signal. Each of the pentodes 60–65 includes screen grids 66–71 connected through individual screen grid resistors 72, 73, 74 to point 57. The screen grid potential varies the plate current flowing through the anode resistors 75, 76, 77 of the individual tubes and hence the potential at anode terminals 45–50 in response to the control signal. In addition, the plate current flowing through the anode resistors may be individually controlled in response to the reference control signal from the reference control circuit 32. These reference control signals are impressed on terminals **37*b*–42*b* and coupled to the control grids of pentodes 60–65 and vary the current flow through the tubes. Accordingly, the output voltages at terminals 50, 49, 48, 47, 46, 45** which are applied to the screen grids of the channel amplifiers vary in response to both the overall transmitted signal level (i.e., ratio of carrier to second sideband) and the individual reference signal.

In operation, if the second lower sideband voltage should increase relative to the unmodulated carrier voltage, indicating that $\delta>1.84$, increased current is drawn by double triode 56. This accordingly reduces its resistance and raises the voltage at point 57 toward the voltage at B+. The voltage at the screen grids of tubes 60–65, therefore, becomes more positive increasing the screen grid current and increasing the plate currents drawn by tubes 60–65, thereby lowering the anode potential of these tubes. As the potential at the anodes and at terminals 50, 49, 48, 47, 46, 45 decreases, there is a corresponding decrease, in the potential on the screen grid electrodes of the channel amplifiers. This lowering of the screen grid potential causes a corresponding decrease in the gain of these amplifiers such that the modulating signal output of the amplifiers is reduced sufficiently to reduce the index of modulation to the desired value of approximately 1.84.

Similarly, if the unmodulated carrier voltage increases relative to the second lower sideband voltage, indicating that $\delta<1.84$, triode 56 draws less current, increasing its resistance and making point 57 less positive. This reduces the screen grid voltage of tubes 60–65 and decreases the plate current. The anode potential increases and the potential on the screen grid electrodes of the channel amplifiers, which are connected to terminals 50, 49, 48, 47, 46, 45 increases correspondingly. This increase in screen grid potential causes an increase in the gain of the channel amplifiers such that the modulating signal output of the channel amplifiers increases to increase the index of modulation to the desired value of approximately 1.84.

Figure 4:
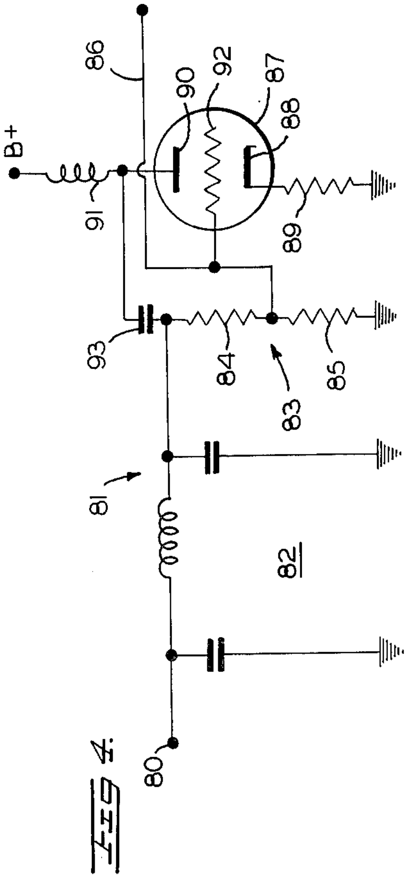
FIG. 4 is a circuit diagram of one channel of the signal channel combining means in the preferred embodiment of the subject invention.

FIG. 4 illustrates a combiner and isolator stage forming part of combiner 18 of FIG. 1 wherein the individual subcarrier channel signals are combined to produce a single modulating signal, containing all of the subcarrier information, which is impressed on modulator 22. Since all of these subcarrier signals must be combined as a single signal and transmitted over a single common conducting path to the modulator, and since these signals are of different frequencies, some means must be provided to isolate the individual channels to prevent feedback and undesirable intermodulation. The subcarrier signal from one of the channels is impressed on input terminal 80 of combiner-isolator stage 81. The subcarrier is applied through an impedance matching and filter L-C pi ($\pi$) network 82 to an output voltage divider 83 consisting of two series connected resistors 84 and 85. The junction of resistors 84 and 85 is connected through lead 86 to a common signal conducting path, not shown, to which the remaining subcarrier channels are also connected. Hence, signals from one or more of the other signal channels can be transmitted over lead 86, voltage divider 83, network 82, to the signal channel coupled to terminal 80 to produce undesired intermodulation products. To prevent such feedback and intermodulation is the purpose of triode isolating stage 87. Triode 87 includes a cathode 88 connected to ground through a cathode resistor 89, an anode 90 connected to the positive terminal B+ of an energizing source through choke 91, and a control grid 92 connected to output lead 86. Triode 87 thus produces a 180° out of phase cancellation voltage which prevents any feedback to terminal 80 and its associated channel. Thus, if a feedback voltage from one or more of the other channels is transmitted over lead 86 to the junction of resistors 84 and 85, this voltage is also applied to control grid 92 thereby producing by tube inversion, a corresponding 180° out of phase voltage at anode 90 which is applied through coupling capacitor 93 to voltage divider 83 to cancel the feedback voltage. Tube 87, therefore, isolates the signal channel from the remaining channels thereby substantially eliminating intermodulation.

It should be obvious to one skilled in the art that any control means which compares a different portion of the F.-M. wave frequency spectrum, as for example, the second lower sideband signal voltage and the unmodulated carrier signal voltage, to produce a control signal, can serve as a means to raise or lower the gain of the signal channels. The increased or decreased gain will cause the modulating signal output of the amplifiers to maintain the desired index of modulation at approximately 1.84. Referring again to the graph shown in FIG. 1, it will be noted that the control need not be particularly sensitive between the range of index of modulation from 1.5 to 2.1, as over this range, there will never be any greater than a five decibel decrease in signal level for signals transmitted at the first lower sideband with respect to the maximum signal level for the unmodulated carrier frequency signal.

Figure 5:
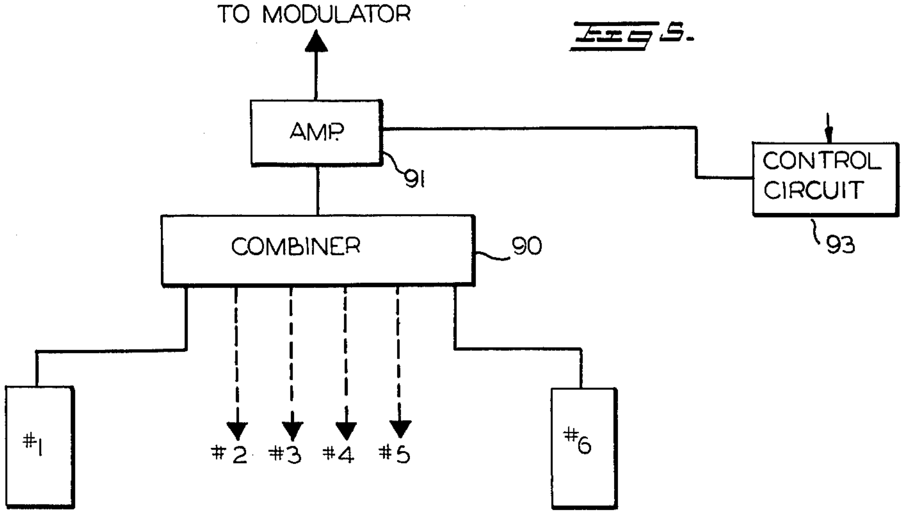
FIG. 5 is a partial block diagram of an alternative embodiment of the communication system.

An alternative embodiment of the invention is illustrated in FIG. 5 wherein the individual voice modulated subcarrier frequency signals from channels 1–6, only two of which are shown, are fed directly into a channel combiner 90 and then into a single, common amplifier 91 rather than a plurality of amplifiers as in the preferred embodiment. This amplifier may be of the pentode type with variable gain through the screen grid potential or plate electrode potential or both. The amplifier is connected between the output of the channel combiner 90 and one input of the modulator, such as modulator 22 of FIG. 1. An output control signal from control means 93 may be applied to the screen grid electrode of amplifier 91 via conductor 38. The control signals from the control means maintain the modulating signal output of amplifier 91 at the level necessary to obtain the desired index of modulation at approximately 1.84 as described above with respect to the preferred embodiment of FIG. 1.

It should be obvious to one skilled in the art that in place of using a pentode amplifier, a controllable gain triode amplifier or controllable gain transistor amplifier would be equally applicable to achieve the desired result of raising or lowering the amplitude of the modulating signal output of the amplifiers to produce the desired index of modulation of 1.84.

Figure 6:
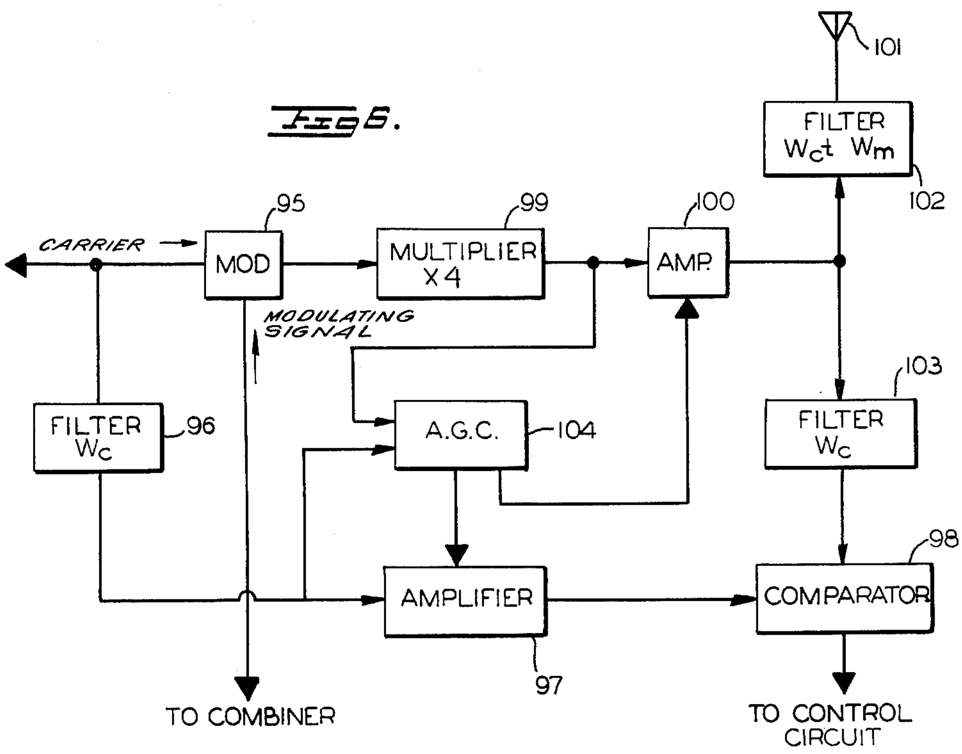
FIG. 6 is a block diagram of yet another alternative embodiment of the subject invention.

FIG. 6 is yet another alternative embodiment in which the desired control is achieved by comparing the carrier with itself. The original carrier level before modulation is compared with the unmodulated carrier component of the F.-M. wave, i.e., $J_0(0)$ is compared with $J_0(\delta)$ for a predetermined value of $\delta$. Since the relative values of the Bessel function of the first order ($J_0(\delta)$) for various values of $\delta$ are known it is possible to control the power level by sensing their relative magnitudes. The unmodulated carrier from the oscillator, not shown, is applied to the modulator where it is angularly modulated by the six subcarrier signals from the combiner, not shown. The unmodulated carrier is also applied through a carrier filter 96 and an amplifier 97 to a signal comparator 98. The modulated signal from modulator 95 is multiplied in multiplier 99, amplified in amplifier 100 and the lower sideband pass to antenna 101 through sideband filter 102. The unmodulated carrier component is passed through carrier filter 103 to comparator 98 where-it is compared to the original carrier to produce a control signal proportional to their ratio. The control signal is then utilized to control the signal channels to maintain the modulation index $\delta$ at the desired value, since both carrier signals are amplified at various stages in the transmitter, a common automatic gain control circuit (A.G.C.) is provided. The A.G.C. provides equal gain for amplifiers 97 and 100 in order to maintain the ratio of $J_0(0)$ (prior to modulation) and $J_0(\delta)$ (the unmodulated carrier component) in their original relationship. Obviously, if only the unmodulated carrier component were amplified in amplifier 97, the original meaningful relationship between $J_0(0)$ and $J_0(\delta)$ would be lost. By equal gain amplification, this original meaningful relationship is retained independent of the absolute values of these signal amplitudes.

Although particular embodiments of the subject invention have been described, many modifications may be made and it is understood to be the intention of the appended claims to cover all such modifications that fall within the true spirit and scope of the invention.

What is claimed as new and desired to be secured by Letters Patent is:

1. In an angularly modulated communication ssytem wherein optimum power output of the transmitted information bearing portion of the modulated wave is achieved, the combination comprising (a) means for angularly modulating a carrier wave with information bearing signals to produce an information bearing modulated wave having a frequency spectrum comprising an unmodulated carrier component and a plurality of sidebands, (b) means for transmitting a selected portion of the frequency spectrum of said modulated wave, said selected portion including at least one of the sidebands bearing the desired information, (c) means for producing a control signal in response to the relative strength of a portion of the frequency spectrum of said modulated wave other than the transmitted sideband, where the strength of said other portion bears a known relationship to the level of the transmitted sideband, and (d) means for optimizing the transmitted level of said selected portion of said modulated wave in response to said control signal by varying a selected parameter of said information signal.

2. In an angular modulation communication system with optimum power output control of an information bearing portion of the modulated wave, the combination comprising (a) means for producing an angular modulated information bearing wave having a frequency spectrum comprising an unmodulated carrier component and a plurality of sidebands, (b) means for transmitting a selected portion of the frequency spectrum of said modulated wave, said portion being one of the sidebands bearing the desired information, (c) means to optimize the level of the information bearing transmitted sideband by controlling the modulation index of said wave, including, (1) means to produce a control signal in response to the relative level of portions of the frequency spectrum other than said transmitted sideband of said modulated wave where the level of said other portion bears a known relationship to the level of the transmitted sideband, and (2) means to control the modulation index of said modulated wave in response to said control signal to maintain the level of the transmitted sideband at an optimum.

3. In a frequency modulated transmitter, the combination comprising (a) means for producing an information bearing frequency-modulated wave having a frequency spectrum comprising an unmodulated carrier component and a plurality of sidebands, (b) means for transmitting one sideband of said modulated wave, (c) means for maintaining the modulation index of said wave at a predetermined value and thereby optimizing the output level of the transmitted sideband, including (1) means to produce a control signal in response to the relative level of at least two different portions of the frequency spectrum of the modulated wave other than said transmitted sideband, and (2) means to control the modulation index of said wave in response to said control signal to maintain the level of said transmitted sideband at an optimum.

4. In a frequency modulated transmitter, the combination comprising (a) means for producing a frequency modulated wave having a frequency spectrum comprising an unmodulated carrier component and a plurality of sidebands, (b) means for transmitting a first sideband of said modulated wave, (c) means for maintaining the index of modulation of said wave at a predetermined value to optimize the level of the transmitted first sideband, including (1) means to compare the relative level of the unmodulated carrier component and the second sideband of said modulated wave and to produce a control signal in response thereto, and (2) means to control the modulation index of said modulated wave in response to said control signal to maintain the index at a predetermined value to optimize the level of the transmitted first sideband.

5. The frequency modulated transmitter according to claim 4 wherein said modulating index is maintained at a value of approximately 1.84 whereby the first sideband level is at a maximum.

6. A multi-channel communication system comprising, (a) first means providing at least one subcarrier frequency information signal, (b) an oscillator for producing a carrier frequency signal, (c) a modulator, (d) second means connecting the output of said oscillator to said modulator, (e) third means connecting the subcarrier frequency information signals from the output of the first means to said modulator to modulate the carrier frequency signal of the oscillator to modulate the carrier signal to produce an angularly modulated signal having a frequency spectrum including an unmodulated carrier component and a plurality of sidebands, (f) a first filter means to pass signals having the frequency of one of the first sidebands of said modulated signal,
(g) a second filter means to pass signals having the frequency of one of the second sidebands of said modulated signal,
(h) a third filter means to pass signals having the frequency of the unmodulated carrier signal,
(i) fourth means connecting the output of said modulator to said first filter means,
(j) output terminal means,
(k) fifth means connecting the output of said first filter means to said output terminal means to transmit the information signals at the frequency of said first sideband signals,
(l) control means responsive to the amplitude of the second sideband signal and the unmodulated carrier frequency signal of said modulated signal and connected to said first means to control the amplitude of said subcarrier frequency information signals to thereby control the index of modulation of said modulated signal,
(m) sixth means connecting the output of said modulator to said second filter means,
(n) seventh means connecting the output of said second filter means to said control means,
(o) eighth means connecting the output of said modulator to said third filter means, and
(p) ninth means connecting the output of said third filter means to said control means.

7. The invention of claim 6 in which the control means connected to said first means control the amplitude of said subcarrier frequency information signals to thereby maintain the index of modulation of said modulated signal at approximately 1.84.

8. The invention of claim 6 in which the control means connected to said first means controls the amplitude of said subcarrier frequency information signals to thereby maintain the index of modulation of said modulated signal in a range from 1.5 to 2.1.

9. A multi-channel communication system comprising,
(a) first means providing a plurality of subcarrier frequency information signals,
(b) second means to combine said information signals,
(c) an amplifier,
(d) third means connecting the output of said second combining means to said amplifier,
(e) an oscillator for producing a carrier frequency signal,
(f) a modulator,
(g) fourth means connecting the output of said oscillator to said modulator,
(h) fifth means connecting the subcarrier frequency output of said amplifier to said modulator to modulate the carrier frequency signal of the oscillator to generate an angularly modulated signal having an unmodulated carrier component and a plurality of sideband components having a desired index of modulation,
(i) a first filter means to pass signals having the frequency of the first lower sideband signal of said modulated signal,
(j) a second filter means to pass signals having the frequency of the second lower sideband signal of said modulated signal,
(k) a third filter means to pass signals having the frequency of the unmodulated carrier component,
(l) sixth means connecting the output of said modulator to said first filter means,
(m) output terminal means,
(n) seventh means connecting the output of said first filter means to said output terminal means to transmit the information signals at the frequency of said first lower sideband signals,
(o) control means responsive to the amplitude of the second lower sideband and the unmodulated carrier frequency component of said modulated signal and connected to said amplifier to control the amplitude of said subcarrier frequency information signals to thereby control the index of modulation of said modulated signal,
(p) eighth means connecting the output of said modulator to said second filter means,
(q) ninth means connecting the output of said second filter means to said control means,
(r) tenth means connecting the output of said modulator to said third filter means, and
(s) eleventh means connecting the output of said third filter means to said control means.

10. The invention of claim 9 in which the control means connected to the amplifier controls the amplitude of said subcarrier frequency information signals to thereby maintain the index of modulation of said modulated signal at approximately 1.84.

11. The invention of claim 9 in which the control means connected to the amplifier controls the amplitude of said subcarrier frequency information signals to thereby maintain the index of modulation of said modulated signal in a range from 1.5 to 2.1.

12. A multi-channel communication system comprising,
(a) means providing a plurality of subcarrier frequency information signals,
(b) a plurality of amplifiers,
(c) means connecting respective ones of said plurality of information signals to said amplifiers,
(d) means to combine the output signals of said plurality of amplifiers,
(e) an oscillator for producing a carrier frequency signal,
(f) a modulator,
(g) means connecting the output of said oscillator to said modulator,
(h) means connecting the subcarrier frequency output of said signal combining means to said modulator to modulate the carrier frequency signal of the oscillator to generate a frequency modulated wave having a frequency spectrum comprising an unmodulated carrier component and a plurality of sidebands
(i) a multiplier means to increase the frequency modulated signal frequency to a transmission frequency,
(j) means connecting the frequency modulated signal output of said modulator to said multiplier,
(k) a first filter means to pass signals having a frequency of the first lower sideband signal of frequency modulated signal,
(l) a second filter means to pass signals having the frequency of the second lower sideband signal of said modulated signal,
(m) third filter means to pass the unmodulated carrier signal component,
(n) means connecting the output of said multiplier to said first filter means,
(o) an output terminal means,
(p) means connecting the output of said first filter means to said output terminal means to transmit the information bearing first lower sideband signal,
(q) control means responsive to the amplitude of the second lower sideband signal and the unmodulated carrier component of said frequency modulated signal and connected to said plurality of amplifiers to control the amplitude of said subcarrier frequency information signals to thereby control the index of modulation of said frequency modulated wave,
(r) means connecting the output of said multiplier to said second filter means,
(s) means connecting the output of said second filter means to said control means,
(t) means connecting the output of said multiplier to said third filter means, and
said third filter means, and (u) means connecting the output of said third filter means to said control means.

13. The invention of claim 12 in which the plurality of subcarrier signals are spaced apart equally in frequency.

14. The invention of claim 12 in which the control means connected to the plurality of amplifiers controls the amplitude of said subcarrier frequency information signals to thereby maintain the index of modulation of said frequency modulated signal at approximately 1.84.

15. The invention of claim 12 in which the control means connected to the plurality of amplifiers controls the amplitude of said subcarrier frequency information signals to thereby maintain the index of modulation of said frequency modulated signal in a range from 1.5 to 2.1.

References Cited by the Examiner

UNITED STATES PATENTS

| | | | |
|---|---|---|---|
| 2,293,022 | 8/1942 | Crosby | 325—134 |
| 2,761,105 | 8/1956 | Crosby | 325—137 |
| 2,877,305 | 3/1959 | Stenning | 179—15 |
| 3,020,348 | 1/1962 | Coth | 333—16 X |
| 3,112,481 | 11/1963 | Goldberg | 343—14 |

FOREIGN PATENTS

| | | |
|---|---|---|
| 750,955 | 6/1956 | Great Britain. |

OTHER REFERENCES

Terman, F. E., Radio Engineering, New York, 1947, pages 171 and 487.

DAVID G. REDINBAUGH, *Primary Examiner.*

B. V. SAFOUREK, *Assistant Examiner.*